Figure 1:
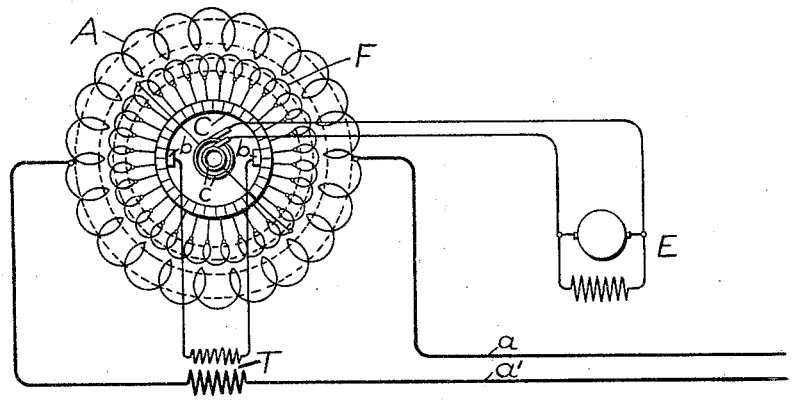

No. 816,395. PATENTED MAR. 27, 1906.
C. P. STEINMETZ.
ALTERNATING CURRENT GENERATOR.
APPLICATION FILED JULY 25, 1904.

Witnesses.

Inventor:
Charles P. Steinmetz.
by Albert G. Davis
Att'y.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK

ALTERNATING-CURRENT GENERATOR.

No. 816,395.

Specification of Letters Patent.

Patented March 27, 1906.

Application filed July 25, 1904. Serial No. 217,997.

*To all whom it may concern:*

Be it known that I, CHARLES P. STEINMETZ, a citizen of the United States, residing at Schenectady, county of Schenectady, State of New York, have invented certain new and useful Improvements in Alternating-Current Generators, of which the following is a specification.

My invention relates to the compounding of alternating-current generators for varying loads and power factors.

It has been proposed heretofore to excite the field of an alternating-current generator with a constant direct-current excitation supplemented by a second excitation, corresponding to the series excitation of a compound-wound direct-current generator, obtained by rectifying the whole or a part of the armature-current and delivering it to a separate winding on the field. This method of compounding corresponds strictly to that employed in direct-current generators. As the load increases the field flux increases, and the potential at the generator-terminals may be maintained constant or increased. It does not compensate, however, for the variation in armature reaction due to varying power factor. The magnetizing effect of the armature-current on the field varies greatly with the power factor, even if the amount of current remains practically constant, and consequently the method of compounding which I have briefly described is not suitable for use with a generator supplying a load of widely-varying power factor. Furthermore, with the above arrangement the compounding of a polyphase machine can at best be adjusted only for the average load of the several phases. Consequently, if the phases are loaded unequally the voltage of the phase having the heaviest load or the lowest power factor will be too low and the voltage of another phase too high. A second arrangement for compounding alternating-current generators that has been suggested heretofore consists in supplying the field with a distributed winding and a commutator like the armature of the ordinary direct-current machine. Through brushes bearing on this commutator polyphase currents are supplied to the distributed winding, these currents being so derived from the armature-currents that proper compounding is obtained. The method of deriving these exciting-currents consists in the use of shunt-transformers to produce the constant excitation like the shunt-winding of a direct-current machine and series transformers to produce the compounding excitation, like the series winding of an ordinary direct-current machine. This arrangement, while it accurately compensates for varying load and power factor and while it compounds the phases separately, since each portion of the armature-field may have adjacent to it a distributed winding, carrying a current proportional in amount and varying in power factor therewith, is subject to the disadvantage that since it is self-exciting it may lose its excitation in case of a short-circuit, and, moreover, the excitation furnished by the shunt-transformers is not necessarily constant, but depends upon the voltage at the armature-terminals.

The object of my invention is to provide a novel arrangement for compounding, which combines the advantages of both the arrangements briefly described above. In common with the second arrangement, varying loads and power factors are properly compensated for and the different phases of the armature are separately compounded, while it possesses the advantages of the first arrangement, in that no danger exists of its losing its excitation under any circumstances.

My invention consists in employing a distributed field-winding with a commutator, such as has been heretofore mentioned, and supplying to fixed points thereon a direct current excitation and accomplishing the compounding by means of a series transformer connected to brushes bearing on the commutator.

My invention will best be understood by reference to the accompanying drawings, in which—

Figure 2:
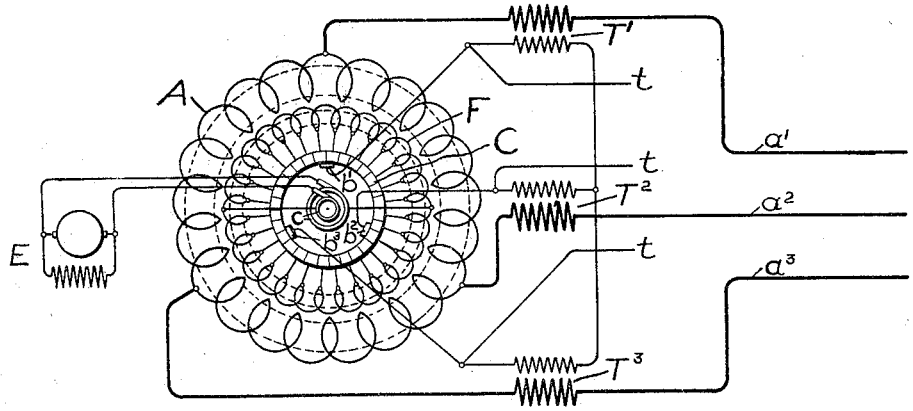

Figure 1 shows a single-phase alternating-current generator arranged in accordance with my invention, and Fig. 2 shows a polyphase generator similarly arranged.

Referring first to Fig. 1, A represents the armature of an alternating-current generator connected to the mains $a$ $a'$. F represents the field-winding, which is shown as a distributed winding connected to a many-part commutator. Although both armature and field windings are shown as Gramme-ring windings; it will be understood that the armature-winding may be of any well-known type of distributed winding supported in holes or slots in a laminated structure, while the field-winding may be similar to any of the well-known forms of armature-windings for direct-current machines. In addition to its connections to the commutator C the field-winding F is connected at two fixed points to the collector-rings c. E represents a direct-current exciter, which supplies the field-winding F through the collector-rings. The direct current in the field-winding F produces a constant field, rotating with the field structure in the same manner as when a polar winding is employed. In addition to the direct-current excitation an alternating current is supplied from the series transformer T through the commutator-brushes b b to the field-winding F. This current being obtained from a series transformer varies both in magnitude and in phase with the armature-current, and since the brushes b b are fixed in space and are positioned opposite to the armature-terminals each turn of the field-winding F carries at all times a current which varies in magnitude and phase with the current in an adjacent turn of the armature-winding. The armature reaction may thus be neutralized for all loads and power factors and proper compounding thereby secured.

In Fig. 2 I have shown my invention as applied to a three-phase machine. The armature-field A is connected to the three line-wires $a'$, $a^2$, and $a^3$. The field-windings F is provided with a commutator C and collector-rings c, the latter being supplied with direct current from the exciter E. Instead of two commutator-brushes three brushes $b'$, $b^2$, and $b^3$ are employed, and three transformers T', T², and T³ are connected to the brushes, the primaries of the transformers being connected in circuit with the several phases of the armature. With the connections as shown it will be seen that if the load on one phase—as, for instance, on the mains $a' a^2$—is greater than that on the other two phases the potential impressed upon brushes $b'$ and $b^2$ will be greater than the potential impressed between brushes $b'$ and $b^3$ or $b^2$ and $b^3$. A larger current consequently flows in that part of the field-winding which is adjacent to the most heavily loaded part of the armature-winding. Thus the different loads on the separate phases are separately and automatically compensated for. What is true as to the amount of current-flow is also true as to phase. If the power factor of the load on one phase is different from the power factor of the loads on the other phases, the phase of the current in the adjacent portion of the field-winding will also differ from the phase of the currents in the rest of the field-winding.

A number of alternators compounded in accordance with my invention may be operated in parallel, the same as with compounded direct-current generators. In Fig. 2 I have shown equalizer connections t from the terminals of the three compounding transformers, these connections corresponding to the equalizer connections employed with the series winding of a direct-current generator.

While for the sake of simplicity I have illustrated my invention as applied to a bipolar machine, it will of course be understood that my invention is applicable to alternating-current generators of any number of poles, as well as of any number of phases.

Many modifications may be made in the arrangement and connections shown without departing from the spirit of my invention, and I aim in the appended claims to cover all such modifications.

What I claim as new, and desire to secure by Letters Patent of the United States, is—

1. In an alterating-current generator, a field structure provided with a distributed winding and a many-part commutator connected thereto, brushes bearing on said commutator, means for supplying direct current to the field to magnetize the field structure on a line fixed relatively thereto, and means for supplying to said brushes a current varying in magnitude and phase with the armature-current.

2. In an alternating-current generator, a field structure provided with a distributed winding and a many-part commutator connected thereto, brushes bearing on said commutator, means for supplying direct current to the field to magnetize the field structure on a line fixed relatively thereto, and a series transformer having its secondary connected to said brushes and its primary connected in the armature-circuit.

3. In an alternating-current generator, a distributed field-winding provided with a many-part commutator, brushes bearing on said commutator, means for supplying to said brushes current varying in magnitude and phase with the armature-current, and means for supplying direct current to fixed points on said field-winding.

4. In an alternating-current generator, a distributed field-winding provided with a many-part commutator, brushes bearing on said commutator, a series transformer having its primary in the armature-circuit and its secondary connected to said brushes, and means for supplying direct current to fixed points on said field-winding.

5. In an alternating-current generator, a distributed field-winding provided with a many-part commutator and with collector-rings, commutator-brushes, collector-ring brushes, a source of direct current connected to the latter brushes, and a series transformer having its secondary connected to the commutator-brushes and its primary connected in the armature-circuit.

6. In an alternating-current generator, a distributed field-winding, means for supplying to said winding at points fixed in space a current varying in magnitude and phase with the armature-current, and means for supplying direct current to said winding at points revolving therewith.

7. In an alternating-current generator, a distributed field-winding, means for supplying to said winding at points fixed with respect to the armature-terminals and opposite thereto a current varying in magnitude and phase with the armature-current, and means for supplying direct current to said winding at points fixed with respect to said winding.

8. In a polyphase generator, a distributed field-winding, means for supplying to the portion of said winding at any given instant adjacent to a phase of the armature-winding a current varying in magnitude and phase with the current in said phase of the armature, and means for supplying a direct current to fixed points on said field-winding.

9. In a polyphase generator, a distributed field-winding, means for supplying to said winding at points fixed with respect to the terminals of the several phases of the armature and opposite thereto currents varying in magnitude and phase with the current in the phase of the armature opposite thereto, and means for supplying direct current to fixed points on said winding.

10. In a polyphase generator, a distributed field-winding provided with a many-part commutator, brushes bearing on said commutator, series transformers having their primaries connected in circuit with the several phases of the armature and their secondaries connected to said brushes so as to supply to each portion of said field-winding a current varying in magnitude and phase with the current in the adjacent portion of the armature, and means for supplying a direct current to fixed points on said winding.

11. In a polyphase generator, a distributed winding provided with a many-part commutator and with collector-rings, a plurality of brushes bearing on said commutator and corresponding in position to the terminals of the several phases of the armature, series transformers having their primaries connected in circuit with the several phases of the primary and their secondaries connected to the commutator-brushes, and a source of direct current connected to said collector-rings.

In witness whereof I have hereunto set my hand this 22d day of July, 1904.

CHARLES P. STEINMETZ.

Witnesses:
BENJAMIN B. HULL,
HELEN ORFORD.